United States Patent
Funaki (10) Patent No.: US 10,878,221 B2
(45) Date of Patent: Dec. 29, 2020

(54) IMAGING DEVICE CAPABLE OF PERFORMING HIGH-SPEED IMAGE RECOGNITION PROCESSING

(71) Applicant: SAMSUNG ELECTRONICS CO., LTD., Suwon (KR)

(72) Inventor: Masaki Funaki, Yokohama (JP)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 59 days.

(21) Appl. No.: 16/040,990

(22) Filed: Jul. 20, 2018

(65) Prior Publication Data

US 2019/0034698 A1 Jan. 31, 2019

(30) Foreign Application Priority Data

Jul. 27, 2017 (JP) .................. 2017-145288

(51) Int. Cl.
| | | |
|---|---|---|
| *G06K 9/00* | (2006.01) | |
| *G06K 9/62* | (2006.01) | |
| *G06K 9/46* | (2006.01) | |
| *H04N 5/343* | (2011.01) | |
| *H04N 5/345* | (2011.01) | |
| *H04N 5/232* | (2006.01) | |

(52) U.S. Cl.
CPC ..... *G06K 9/00234* (2013.01); *G06K 9/00302* (2013.01); *G06K 9/00342* (2013.01); *G06K 9/00624* (2013.01); *G06K 9/4628* (2013.01); *G06K 9/4652* (2013.01); *G06K 9/627* (2013.01); *H04N 5/343* (2013.01); *H04N 5/3456* (2013.01); *G06K 2009/00738* (2013.01); *H04N 5/23219* (2013.01)

(58) Field of Classification Search
CPC .......... G06K 9/00234; G06K 9/00342; G06K 9/4652; G06K 9/4628; G06K 9/627; G06K 9/00624; G06K 9/00302; G06K 2009/00738; H04N 5/3456; H04N 5/343; H04N 5/23219

See application file for complete search history.

(56) References Cited

U.S. PATENT DOCUMENTS

| | | | | |
|---|---|---|---|---|
| 9,501,915 B1 * | 11/2016 | Laska | ................. | H04N 7/181 |
| 2012/0121173 A1 * | 5/2012 | Aisaka | ............... | G06K 9/00261 |
| | | | | 382/165 |
| 2017/0220891 A1 * | 8/2017 | Kim | ................. | G06N 3/082 |

FOREIGN PATENT DOCUMENTS

JP  2015210677 A  11/2015

* cited by examiner

*Primary Examiner* — Christopher Wait
(74) *Attorney, Agent, or Firm* — Sughrue Mion, PLLC (57) ABSTRACT

An imaging device includes an image pickup device, a video signal processor, and an image recognition unit. The image pickup device outputs an image signal composed of a plurality of frames. The video signal processor performs processing for creating a video signal for display from the image signal. The image recognition unit performs a plurality of pieces of recognition processing for the image signal. The processing of the video signal processor and the processing of the image recognition unit are executed in parallel to each other.

11 Claims, 4 Drawing Sheets

IMAGING DEVICE CAPABLE OF PERFORMING HIGH-SPEED IMAGE RECOGNITION PROCESSING

CROSS REFERENCE TO RELATED APPLICATION

This application is based upon and claims the benefit of priority under 35U.S.C.§ 119 from Japanese Patent Application No. 2017-145288 filed on Jul. 27, 2017, the entire contents of which are incorporated herein by reference.

BACKGROUND

The present disclosure relates to an imaging device having a function to recognize an image.

Conventionally, in the case of recognizing an image using an imaging device, a video signal (in particular, a YUV signal) output from the imaging device has been used. Japanese Unexamined Patent Application Publication No. 2015-210677 describes that an information processing apparatus extracts feature points from a YUV422 signal with a frame rate of 30 frames per second (fps), which is output from an image sensor that functions as a monocular camera. In this case, since the frame rate is 30 fps, the feature points are extracted about every 33 ms. That is, the information processing apparatus extracts each of the feature points from information at least one frame (33 ms) before.

SUMMARY

In the case where a change of an ambient environment is fast, and an image is required to be recognized immediately, then such a conventional configuration of the imaging device may sometimes cause a problem. A case is considered, for example, where an instrument on which the conventional imaging device is mounted is a moving object and moves at a high speed. If it is assumed that the moving object moves at 100 km/h, then the moving object moves by 92 cm during 33 ms equivalent to one frame. Hence, if some problem occurs in a travel direction of the moving object, then the correspondence is delayed by this elapse of the frame.

An aspect of one or more embodiments provides an imaging device including: an image pickup device configured to output an image signal composed of a plurality of frames; a video signal processor configured to perform processing for creating a video signal for display from the image signal; and an image recognition unit configured to perform a plurality of pieces of recognition processing for the image signal, wherein the processing of the video signal processor and the processing of the image recognition unit are executed in parallel to each other.

DETAILED DESCRIPTION

A description will be given below of an imaging device according to one or more embodiments.

Figure 1:
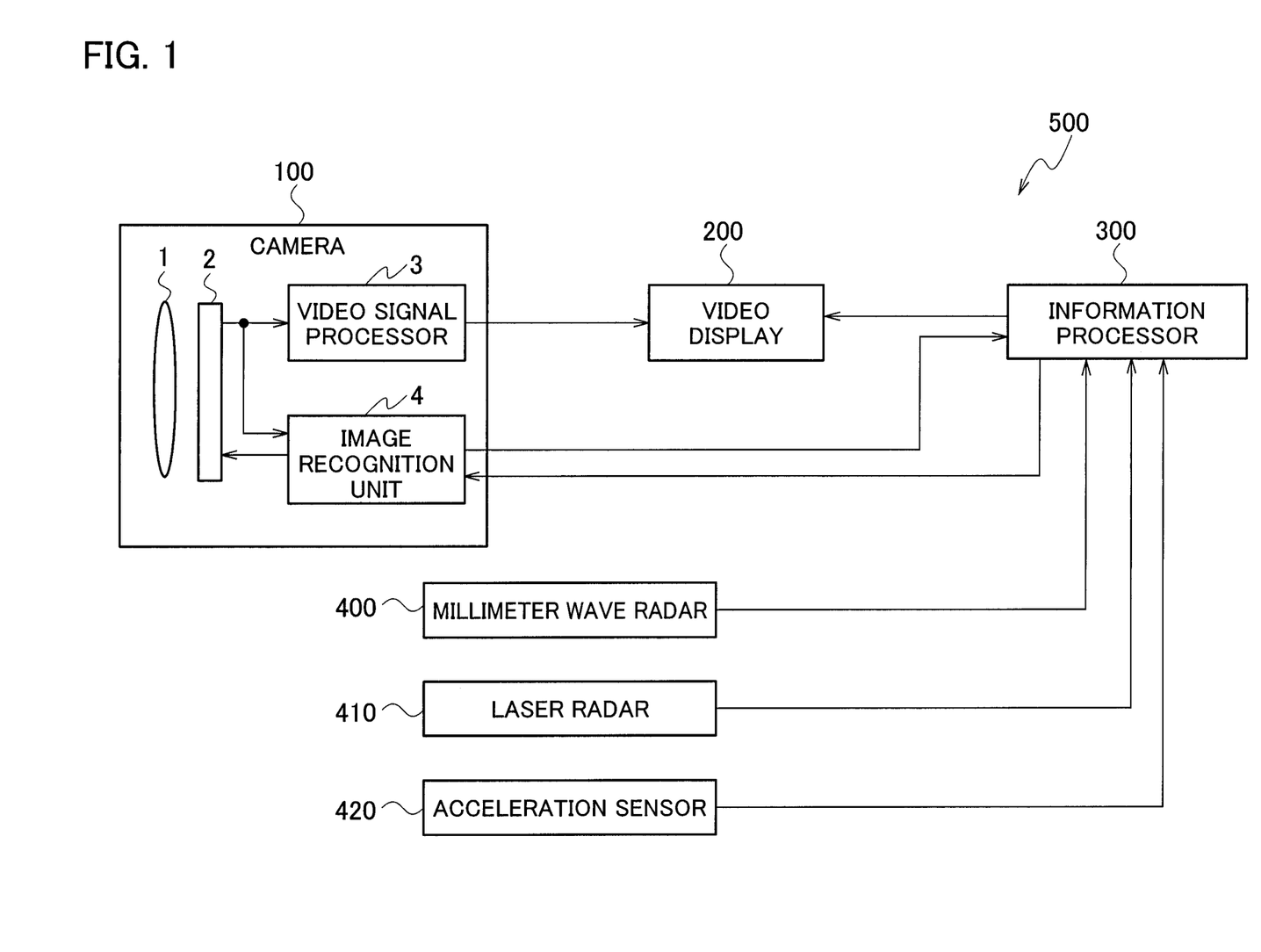
FIG. 1 is a block diagram illustrating an information processing apparatus including an imaging device according to one or more embodiments.

FIG. 1 is a block diagram illustrating an information processing apparatus 500 including an imaging device 100 according to one or more embodiments. The information processing apparatus 500 includes an imaging device 100, a video display 200, an information processor 300, a millimeter wave radar 400, a laser radar 410, and an acceleration sensor 420.

The imaging device 100 includes a lens 1, an image pickup device 2, a video signal processor 3, and an image recognition unit 4. The image pickup device 2 is a CCD or CMOS sensor, and includes an illustrated analog to digital converter (ADC). The imaging unit 2 outputs a plurality of frames of digital RAW data in which pixels of red (R), green (G), and blue (B) are arranged in a predetermined array. The RAW data is a first image signal. The RAW data is supplied to the video signal processor 3 and the image recognition unit 4.

The video signal processor 3 is provided for the purpose of creating a video that is natural seen with human eyes. The video signal processor 3 outputs a YUV signal as a video signal to be displayed, and the video display 200 displays a video that is based on the YUV signal.

The image recognition unit 4 is provided for the purpose of obtaining information to be described later from the RAW data. Specifically, the image recognition unit 4 extracts a predetermined feature in an image, estimates a portion that is not displayed as the image, estimates a state after several frames, and detects a dangerous state. That is, in the imaging device 100, the image recognition unit 4 recognizes the image in parallel to the video signal processing carried out by the video signal processor 3, and outputs a result of the recognition. Recognition information that is an image recognition result by the image recognition unit 4 is supplied to the information processor 300.

The information processor 300 is supplied with not only the recognition information supplied from the image recognition unit 4, but also information output from a variety of sensors such as the millimeter wave radar 400, the laser radar 410, and the acceleration sensor 420, for example. The information processor 300 determines these pieces of information comprehensively. A part of the determination results is displayed on the video display 200. The information processor 300 is composed of a central processing unit (CPU), a memory that stores a program, a field programmable gate array (FPGA) or the like, for example.

Conventionally, the image has been recognized outside of the imaging device based on the YUV signal output by the imaging device. In one or more embodiments, the image is recognized inside of the imaging device 100 in parallel to the video signal processing. Accordingly, the information processor 300 is able to make a quicker determination than the conventional manner.

A more detailed description will be given of the imaging device 100 with reference to FIG. 2.

The video signal processor 3 includes, as image processing circuits, a white flaw correction circuit 31, a shading correction circuit 32, a demosaic circuit 33, a correction circuit 34, and a color space processing circuit 35. The respective image processing circuits of the video signal processor 3 process the RAW data, which is supplied from the image pickup device 2 in a predetermined order, and creates the image signal. If the image signal output from the white flaw correction circuit 31 or the shading correction circuit 32 is defined to be a second image signal, then an image signal output from the demosaic circuit 33 is a third image signal.

In the case where a signal level of a pixel of interest is significantly greater than a signal level of peripheral pixels, then the white flaw correction circuit 31 determines that the pixel of interest is a white flaw, and interpolates the signal level of the pixel of interest from the signal level of the peripheral pixels.

In the case where a signal level of a peripheral portion of the image is different from a signal level of a vicinity of the center thereof mainly due to optical characteristics of the lens or the like even when a subject with an even luminance is captured, then the shading correction circuit 32 corrects the signal level so that the signal level becomes even in the entire image.

In the case where color filters are arrayed according to a predetermined rule, the demosaic circuit 33 creates an image signal in which signals of the respective colors are assigned to all of the pixels in one frame. The array of the color filters is often a Bayer array using color filters of R, G, and B. Moreover, an array is sometimes formed which does not have the color filters but includes pixels having sensitivity for light ranging from visible light to near infrared light. Such pixels as described above are sometimes called "white".

The correction circuit 34 corrects various characteristics of the image. Such correction includes white balancing, contour correction, and gamma correction. The white balancing means that the respective signals of R, G, and B are adjusted in a white subject so as to have the same magnitude. The contour correction means that signals of a contour portion are emphasized in order to improve resolution of the image. The gamma correction means that a luminance level when the image is displayed on a monitor as the video display 200 is corrected in advance according to characteristics of the monitor so as to be linear.

The color space processing circuit 35 converts the signals of three colors which are R, G, and B into a luminance signal (Y) and color difference signals. Thereafter, the color difference signals are sometimes corrected in order to adjust a hue.

Moreover, the color space processing circuit 35 sometimes performs noise reduction processing. For example, the color space processing circuit 35 performs processing such as noise reduction by adding images in a plurality of frames to one another. In the case of performing such processing using a plurality of frames, the color space processing circuit 35 performs the processing after waiting for input of all the plurality of frames for use to the color space processing circuit 35. Accordingly, by an amount of time of this processing, output of the signal from the color space processing circuit 35 is delayed.

Moreover, the color space processing circuit 35 converts the color difference signals to create a U signal and a V signal, and creates a YUV signal. The YUV signal obtained by being subjected to such processing is output as a video signal from a terminal 50.

The RAW data of the image pickup device 2 is also supplied to the image recognition unit 4. The image recognition unit 4 includes a luminance image creation unit 41, a static filter unit 42, luminance information memories 43 and 44, a dynamic filter unit 45, a luminance image recognition unit 46, a color image recognition unit 47, and a recognition result transmitter 48.

Among them, the respective units from the luminance image creation unit 41 to the luminance image recognition unit 46 process a luminance signal. The color image recognition unit 47 determines a color image. The recognition result transmitter 48 creates a recognition result signal based on recognition results of the luminance image recognition unit 46 and the color image recognition unit 47. The recognition result signal is output from a terminal 51.

The luminance image creation unit 41 will be described. In the image recognition unit 4, most pieces of processing are performed based on luminance information. The luminance image creation unit 41 takes out the luminance information from the RAW data. As the most simple luminance image creation method, there is a method of using only signals of pixels attached with the color filters of G in the case of the Bayer array. Moreover, the pixels called white, which do not have the color filters, treat only the luminance, and accordingly, there is also a method of using the pixel signals of white.

Here, a description will be given of the case where the image pickup device 2 has the Bayer array and the pixel signals of G are used. In this case, resolution of the luminance signal is degraded more than the original resolution that is based on the number of pixels provided in the image pickup device 2. Typically, the luminance signal in demosaic processing is created using not only the pixel signals of G, but also the pixel signals of R and B. Accordingly, resolution in this case is approximately 0.7 to 0.8 times the original resolution. However, in the case of using only the pixel signals of G, the resolution is degraded to approximately 0.5 times since the pixel signals of R and B cannot be used.

In the case of a video to be viewed by a person, such a degradation of the resolution is a serious problem. However, in the case where an object is to perform image recognition, degradation of the resolution is not necessarily important, and affects the image recognition less. Reasons for this will be described later.

When only the pixel signals of G in the Bayer array are used, the signals are lost from the pixels of R and B. Accordingly, the luminance image creation unit 41 interpolates each of the pixels by simply averaging four pixel signals of G around such a lost pixel portion.

Moreover, in the case where a white flaw is present, the white flaw correction circuit 31 corrects the white flaw. Typically, the white flaw is corrected using not only the pixel signals G, but also the pixel signals of R and B, since the appearance is valued. However, the luminance image creation unit 41 corrects the white flaw using only the pixel signals of G, which are adjacent to the white flaw. As a result, the resolution of the luminance image is degraded more than in the case of using not only the pixel signals of G, but also the pixel signals of R and B. In this way, the luminance image creation unit 41 makes more of a speed of the processing than the resolution, and creates the luminance image by simple processing.

Figure 2:
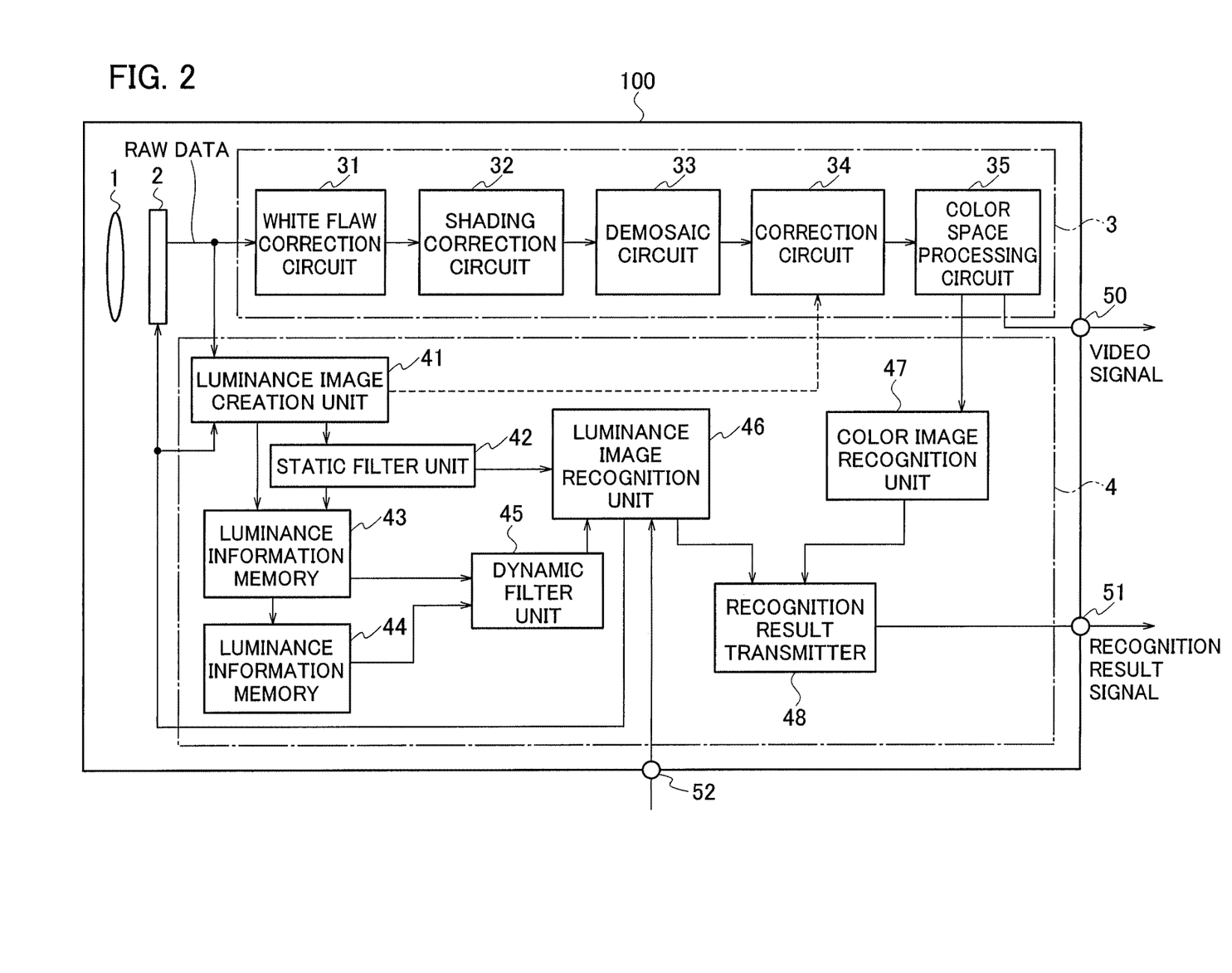
FIG. 2 is a block diagram illustrating a detailed configuration of the imaging device according to one or more embodiments.

Note that, in an emergency operation state, the luminance image created by the luminance image creation unit 41 is sent to the correction circuit 34 through a route of a broken line in FIG. 2. Processing in the case of this emergency operation state will be described later.

The luminance image created by the luminance image creation unit 41 is supplied to the static filter unit 42 and the luminance information memory 43.

The static filter unit 42 will be described. The static filter unit 42 performs filter processing for extracting features from a luminance image of one frame without motion. The filter processing performed here is mainly convolution processing and pooling processing. The convolution processing is processing for smoothing and sharpening an image. The pooling processing is processing for resampling a result of performing such convolution as described above.

The processing as described above is equivalent to reduction of information while leaving the features to be extracted. The filter processing includes the processing for reducing the information as described above. Accordingly, even when an amount of the information inherent in the luminance image is small, such extraction of the feature by the static filter unit 42 is not affected very much thereby. Hence, for the creation of the luminance image, the luminance image creation unit 41 can use a simple method accompanied with degradation of the resolution.

The static filter unit 42 includes filters different for each of the features to be extracted, and operates the filters in parallel to one another. These different filters have already finished learning by deep learning of a neural network, and parameters of these filters are tuned.

Extraction results by the static filter unit 42 are supplied to the luminance information memory 43 and the luminance image recognition unit 46.

Note that in the imaging device 100, the parameters of the filters are not retuned (relearned). This is because when the parameters are retuned, the characteristics of each of the imaging device 100 change with time and deviate from the initial values thereof. The parameters of the filters change only in the case of being externally given in the form of upgrading.

For example, the static filter unit 42 extracts the features as follows:

Shape extraction: The static filter unit 42 extracts a specific shape. The shape includes a vertical line, a horizontal line, a tilted line, a peak of an angle or an acute angle, a quadrangle, a circle, a triangle and the like.

Important object extraction: The static filter unit 42 extracts an important object such as a human body, a car, an animal, or a sign. According to the embodiment, even when the whole of the object is not seen, it is possible to extract a feature thereof when only a part of the object is seen.

Letter or symbol extraction: The static filter unit 42 extracts whether a letter or a symbol is present.

Static contour extraction: The static filter unit 42 extracts a point where the luminance sharply changes in a static image.

Vanishing point extraction: This extraction is used for grasping a sense of distance.

The latest luminance image and the latest extraction result of the static filter unit 42 are written to the luminance information memory 43. The latest luminance image and extraction result, which are thus written, are transferred to the luminance information memory 44 before a luminance image and an extraction result in a next frame are written into the luminance information memory 43. In this way, the information in at least one frame before is stored in the luminance information memory 44.

Note that the extraction of the feature from the luminance image by the static filter unit 42 does not have to be performed after waiting for completion of the supply of the luminance image from the luminance image creation unit 41. Even while the luminance image is being supplied, it is possible to extract a part of the already supplied luminance image.

The dynamic filter unit 45 extracts features related to motions by comparing the information in at least one frame before in the luminance information memory 44 and the information in the luminance information memory 43 with each other. For example, such feature extraction related to the motion is mentioned as follows:

Mass extraction: The dynamic filter unit 45 extracts a mass of pixels which move similarly.

Dynamic contour extraction: At the time of having extracted a mass in the mass extraction, the dynamic filter unit 45 extracts a boundary of the mass as a contour. The dynamic contour extraction is effective in the case where it is difficult to extract a contour from a static image when luminance of a background and luminance of the mass are similar to each other.

Motion direction extraction: The dynamic filter unit 45 extracts a direction where the mass moves.

Motion mode feature extraction: The dynamic filter unit 45 extracts a specific motion mode. For example, the dynamic filter unit 45 extracts whether there is a motion with a specific feature such as a rotation motion, a human walking motion, the bouncing and rolling motions of a ball, and a bird's flying motion.

The dynamic filter unit 45 uses filters having tuned parameters, the filters having already finished learning by the deep learning of the neural network. Moreover, the dynamic filter unit 45 includes filters different for each of the features to be extracted, and operates the filters in parallel to one another.

The features extracted by the static filter unit 42 or the dynamic filter unit 45 are supplied to the luminance image recognition unit 46. The luminance image recognition unit 46 summarizes a plurality of the extracted features, and recognizes contents of the luminance image. For example, the luminance image recognition unit 46 confirms whether a person is the object extracted in the static filter unit 42 is moving as a mass of an object, the feature of the motion mode is a motion mode intrinsic to a person and so on in the result extracted by the dynamic filter unit 45, thereby confirming whether the plurality of features coincide between the extraction results of the static filter unit 42 and the dynamic filter unit 45. In this way, the luminance image recognition unit 46 recognizes the object concerned as a person. As described above, the luminance image recognition unit 46 makes such confirmation from the plurality of features, thereby increasing accuracy of the recognition, and decreasing the probability of erroneously recognizing a doll as a person, for example.

Moreover, the luminance image recognition unit 46 performs various types of estimation work. For example, the luminance image recognition unit 46 performs estimations as follows:

Estimation of anteroposterior relationship: The luminance image recognition unit 46 estimates an anteroposterior relationship among certain mass objects.

Estimation of motion of imaging device itself: The luminance image recognition unit 46 estimates a relative relationship of the imaging device 100 itself with a surrounding such as whether the imaging device 100 itself is moving.

Estimation of motion of the mass in forward/backward direction (depth direction)

Estimation of hidden portion: For example, in the case where a part of a straight thing is hidden, the luminance image recognition unit 46 estimates that a seen portion is extended. Even when the recognized object is temporarily hidden and invisible, the luminance image recognition unit 46 estimates that the object is there.

Estimation (prediction) of future state: The luminance image recognition unit 46 estimates a positional relationship in coming several frames based on an estimation result of the motion. Moreover, the luminance image recognition unit 46 confirms whether an obtained result coincides with an estimation result.

By performing the estimations as described above, the luminance image recognition unit 46 is capable of recognitions as follows, for example. In the case where an object A moves, hides behind an object B and becomes invisible, the luminance image recognition unit 46 recognizes that the object A is present behind the object B though the object A is unseen. Moreover, the luminance image recognition unit 46 estimates that the object A will come out from the other side of the object B after a certain time, and confirms whether the object A will actually come out.

Furthermore, the luminance image recognition unit 46 detects a dangerous state. Here, the detecting of a dangerous state will be referred to as danger detection. The luminance image recognition unit 46 detects danger in a case where a current state is largely different from those in the predictions up to one frame before. For example, it is assumed that a new object, which has not been present one frame before, suddenly appears, and occupies a large portion, for example, 15% or more of the entire image. Then, the dynamic filter unit 45 notifies the luminance image recognition unit 46 that the new object has appeared. The luminance image recognition unit 46 collates a notice thus received with the estimation result, and detects danger if the notice is not estimated in advance.

For an instrument that mounts the imaging device 100 thereon, it is important to detect danger without any frame delay. The imaging device 100 performs the image recognition simultaneously with the video signal processing, and accordingly, detects danger without any frame delay.

In the case where danger is detected, the imaging device 100 shifts to the emergency operation state. The emergency operation state will be described later.

Next, recognition of color information will be described. For example, the recognition of color information is recognition of colors emitted by a traffic signal. Even when the static filter unit 42 extracts the traffic signal, the luminance image does not show such a color of the light emitted from the traffic signal. Accordingly, it is sometimes necessary to recognize the color information. However, a significance of processing the color information at high speed is lower than that for the luminance information. Accordingly, one or more embodiments adopt a configuration of processing the color information after waiting for the result of the color space processing circuit 35.

As a matter of course, in the case where it is problematic that the frame delay is present in the color information, the color information may be processed in parallel to the video signal in a similar way to the case of the luminance signal. In that case, it is preferable to adopt a configuration in which demosaic processing is not performed, and the features are directly extracted from the RAW data of the respective colors (typically, three colors of R, G, and B).

The recognition results of the luminance image recognition unit 46 and the color image recognition unit 47 are sent to the recognition result transmitter 48, are transmitted from the terminal 51 in accordance with predetermined protocol, and are set to the information processor 300. Since an enormous number of the recognition results are sent from the luminance image recognition unit 46 and the color image recognition unit 47, accordingly, the recognition result transmitter 48 selects the recognition results, and sets an order of transmitting the recognition results.

A method or criteria of selecting the recognition results in the recognition result transmitter 48 may be adjusted to features of the instrument that mount the imaging device 100 thereon. However, it is desirable that the result of danger detection be transmitted with the highest priority. It is more desirable that a transmission line dedicated for danger detection be provided.

Note that the terminals 50 and 51 may be either serial bus terminals or parallel bus terminals.

Figure 3:
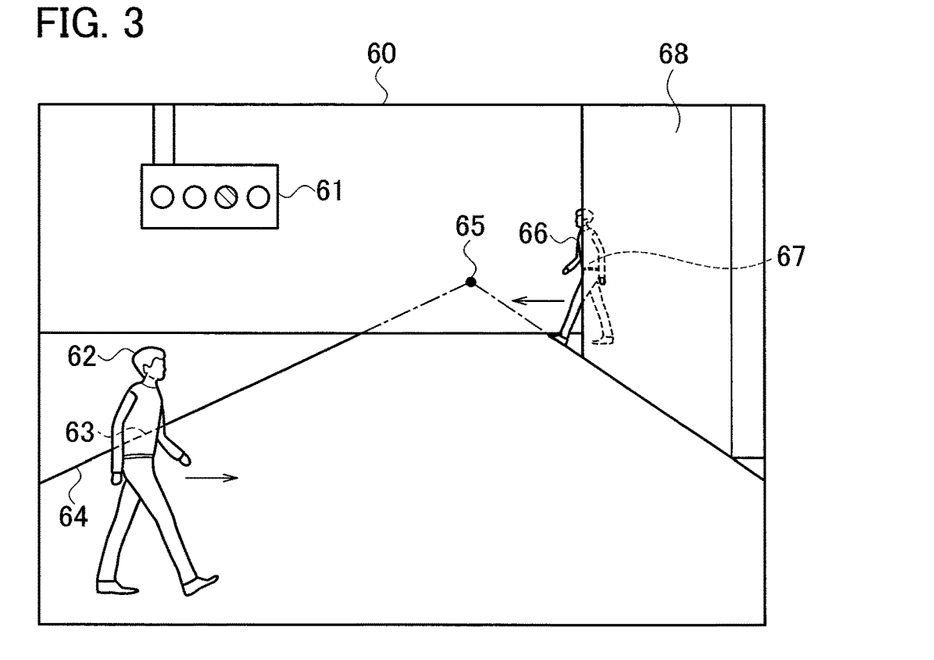
FIG. 3 is a view illustrating an example of an image output by the imaging device according to one or more embodiments.

Next, an example is shown how the luminance image recognition unit 46 recognizes an image. FIG. 3 shows an image 60 of a certain frame in the video signal which the imaging device 100 outputs from the terminal 50. For this image 60, recognition results of the luminance image recognition unit 46 are as follows, for example.

The static filter unit 42 extracts features of persons from an object 62 and an object 66, and reports the extracted features to the luminance image recognition unit 46. Meanwhile, the dynamic filter unit 45 reports to the luminance image recognition unit 46 that the objects 62 and 66 move as individual masses, and also reports that motion modes thereof are the human way of walking. Accordingly, there is no contradiction among the reports. Accordingly, the luminance image recognition unit 46 reports that the objects 62 and 66 are persons, and reports a result of the recognition to the information processor 300.

The static filter unit 42 extracts a vanishing point 65, and from this vanishing point 65, the luminance image recognition unit 46 recognizes a perspective relationship between the object 62 and the object 66. Moreover, based on moving speeds and moving directions of the objects 62 and 66, which are reported by the dynamic filter unit 45, the luminance image recognition unit 46 estimates current and future rough positional relationships between the object 62 and the object 66.

Furthermore, based on estimation of an anteroposterior relationship between the object 66 and an object 68, the luminance image recognition unit 46 recognizes that the object 66 is present behind the object 68. Moreover, based on the recognition of the moving direction of the object 66, the luminance image recognition unit 46 recognizes that the object 66 is coming out of the object 68. In addition, the luminance image recognition unit 46 recognizes that the object 66 is a person, accordingly, also recognizes that an unseen part 67 of a human body is present behind the object 68, and predicts that the part 67 of the human body will be seen after a certain time.

Though a part of a line 64 is hidden behind the object 62, the luminance image recognition unit 46 assumes that the line 64 also continues to an invisible place. Accordingly, the luminance image recognition unit 64 estimates that a broken line 63 is present, and estimates that the broken line 63 will actually appear as the object 62 is moving.

In addition, the static filter unit 42 extracts a shape feature of an object 61 from the object 61, and also extracts features of signs. Accordingly, the luminance image recognition unit 46 sends results of such recognitions to the recognition result transmitter 48. In the case of the signs, the color information thereof is often important. Accordingly, the recognition result transmitter 48 reports colors of the respective portions of the object 61, which are recognized by the color image recognition unit 47, to the information processor 300 in combination with the results from the luminance image recognition unit 46.

In this way, the imaging device 100 is characterized in executing the image recognition processing in parallel to the video signal processing, and outputting the video signal and the recognition result signal (substantially) simultaneously with each other.

Figure 4:
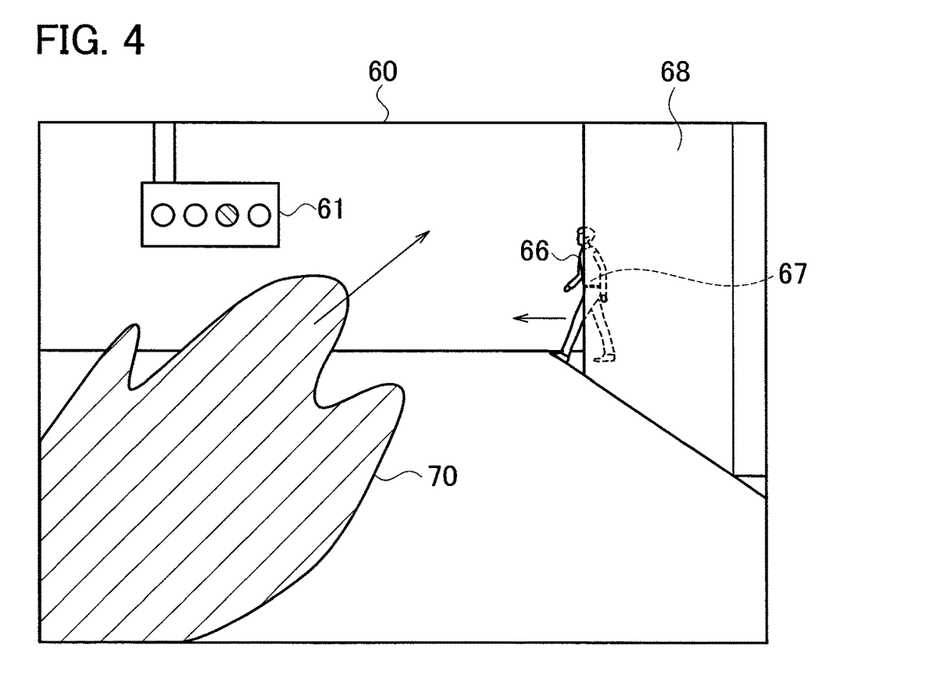
FIG. 4 is an example where the imaging device according to one or more embodiments detects danger.

Next, a description will be given of the emergency operation state when danger is detected by danger detection. For example, it is assumed that the luminance image recognition unit 46 detects danger in the case where the object, which had not been present one frame before, occupies 15% or more of the frame, for example, and this occupation is not pre-estimated. When 15% or more of the next frame of the image 60 in FIG. 3 is occupied by an object 70 as shown in FIG. 4, the luminance image recognition unit 46 detects danger. Upon detecting danger, the imaging device 100 enters the emergency operation state.

Figure 5:
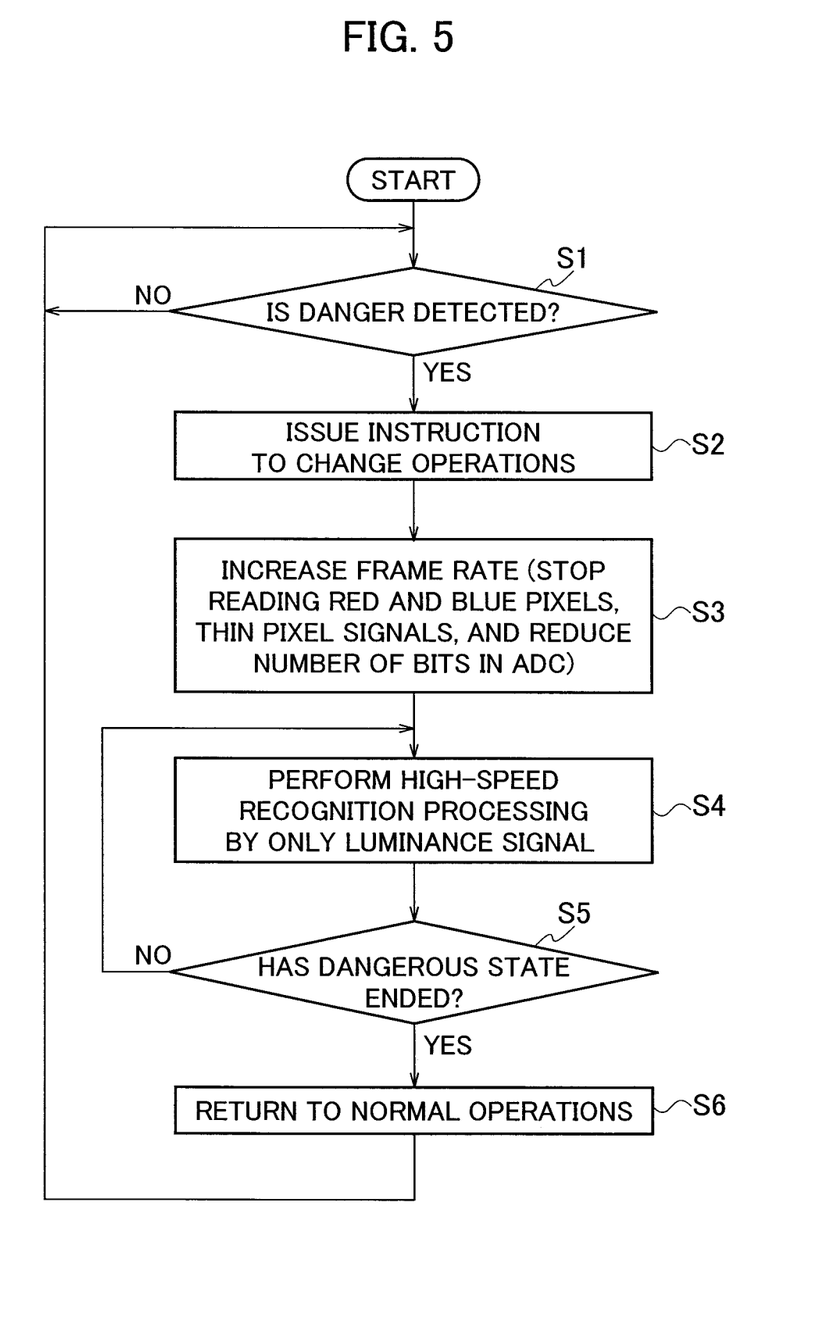
FIG. 5 is a flowchart illustrating operations when the imaging device according to one or more embodiments detects danger.

Operations of the imaging device 100 in the emergency operation state will be described with reference to a block diagram shown in FIG. 2 and a flowchart shown in FIG. 5.

First, in step S1, the luminance image recognition unit 46 determines whether or not to have detected danger. In the case of having detected danger in step S1, then in step S2, the luminance image recognition unit 46 instructs the image pickup device 2 and the luminance image creation unit 41 to change the operations.

Upon receiving the instruction to change the operations, the image pickup device 2 increases the number of imaged images per second (that is, a frame rate) in step S3. For example, the image pickup device 2 multiplies a frame rate of 30 fps until then by 16 to set the frame rate to 480 fps. When the image pickup device 2 increases the frame rate, an imaging interval is shortened, and accordingly, a recognition interval of the luminance image recognition unit 46 can also be shortened.

However, it is not easy for the image pickup device 2 to increase the frame rate to 16 times. A simple increase of the frame rate exceeds processing capabilities of the ADC and the output circuit. Accordingly, the image pickup device 2 reduces the amount of signals per frame.

The luminance signal is mainly required for the image recognition. Accordingly, the image pickup device 2 reads out only the pixel signal of G or the pixel signal of white, which contributes to the luminance, and discards the pixel signals of R and B without reading out the same. In the case of the Bayer array, the amount of the signals output by the image pickup device 2 is halved.

If further necessary, the image pickup device 2 also thins the pixel signals of G (or white) and outputs the thinned pixel signals. For example, the image pickup device 2 reads out only one among four pixel signals of G. Moreover, the image pickup device 2 reduces the number of bits of digital signals, which are created in the ADC, form 14 bits to approximately 7 bits, for example. By combining these plural types of processing, the image pickup device 2 achieves the frame rate of 480 fps.

As a result, the obtained luminance image becomes an image in which resolution is small and gradation is reduced. As described above, in the emergency operation state, priority is given to a speed of obtaining an image, rather than to image quality.

The RAW data output from the image pickup device 2 is already only the luminance signal. Accordingly, the luminance image creation unit 41 performs only simple interpolation for the luminance signal without performing extraction work of the luminance signal. Then, the luminance image creation unit 41 supplies the luminance signal to the static filter unit 42, and stores the luminance signal in the luminance information memory 43.

Moreover, the luminance image creation unit 41 supplies the luminance signal, which is subjected to the simple interpolation, to the correction circuit 34. Contents of the above will be described later.

In step S4, the static filter unit 42 and the dynamic filter unit 45 extract the feature using such a luminance image with small resolution, then notifies the luminance image recognition unit 46 of the extracted feature. Then, the luminance image recognition unit 46 performs the recognition processing. Since the number of pixels is small, the feature extraction and the recognition processing are carried out at a high speed.

Note that, for the static filter unit 42, the dynamic filter unit 45, and the luminance image recognition unit 46, those ready for the emergency operation state may be prepared in advance, and may be used in the emergency operation state. Items in the feature detection may be changed between the emergency operation state and the normal operation state that is otherwise. For example, the number of items may be reduced to a large extent, and a high-speed operation may be achieved.

Recognition contents of the luminance image recognition unit 46 pass via the recognition result transmitter 48, are supplied from the terminal 51 to the information processor 300, and are subjected to a comprehensive determination. For example, the information processor 300 determines to take an action of avoiding danger, such as stopping the operation of the instrument.

In the next step S5, the information processing apparatus 500 determines whether the dangerous state has ended. The luminance image recognition unit 46 may perform this determination, or the information processor 300 may perform this determination and transfer a result of the determination to the image recognition unit 4. In the latter case, the result of the determination by the information processor 300 is transferred from a terminal 52 to the luminance image recognition unit 46. In the case where the dangerous state has not ended, such high-speed recognition processing in step S4 is continued.

In the case where it is determined that the dangerous state has ended, then in step S6, the luminance image recognition unit 46 returns the operation of the image pickup device 2 and the operation of the luminance image creation unit 41 to normal operations. Thereafter, the processing is returned to step S1.

Next, a description will be given of operations of the video signal processor 3 in the emergency operation state. When the image pickup device 2 has entered such a high-speed frame operation, the image signal output from the image pickup device 2 becomes only a luminance image that does not include color information. The luminance image is in a state in which pixels are thinned, and in which the number of frames per second is large. The video signal processor 3 cannot perform usual signal processing by means of the image signal as described above.

However, the thinned luminance signal becomes a luminance signal interpolated by the luminance image creation unit 41, and the interpolated luminance signal is an image that can be handled by the video signal processor 3. Therefore, the luminance image creation unit 41 supplies one frame to the video signal processor 3 every 16 frames. That is, the frame rate of the video handled by the video signal processor 3 remains at 30 fps.

Processing for facilitating a person to view the video of the signal is performed in the video signal processor 3, and the signal is output from the terminal 50. This processing is gamma processing or contour correction, for example. Hence, the luminance image is received from the luminance image creation unit 41 by the correction circuit 34 in the video signal processor 3.

The color space processing circuit 35 converts the luminance image into a YUV signal (that is only a luminance signal without any color signal) displayable on a monitor (video display 200), and outputs the YUV signal from the terminal 50. Hence, the video display 200 displays only a monochrome image in the emergency operation state.

In one or more embodiments, the description has been given of only the case where the RAW data is directly supplied from the image pickup device 2 to the image recognition unit 4. However, if the luminance image is not converted into the YUV signal yet, then according to needs, the luminance image may be branched from a route of the supply and may be supplied to the image recognition unit 4. For example, if there are many white flaws, which may affect the determination, then a design may be made so that the image is supplied to the luminance image creation unit 41 after the processing of the white flaw correction circuit 31 is ended.

Moreover, in the case where the lens gives a large influence to largely decrease the signal level of the vicinity of the image, then the image may be supplied to the luminance image creation unit 41 after being subjected to the processing in the shading correction circuit 32. If the signal is a signal before being converted into the YUV signal, then in any stage, the determination can be made at a higher speed than with a configuration using the conventional imaging device. If the image signal (first or second image signal) before being supplied to the demosaic circuit 33 is branched and supplied to the image recognition unit 4, then the determination can be made at a higher speed, and this is desirable. Hence, these modification examples stay within the scope of the present invention.

Furthermore, as a matter of course, the case where the ADC function is not built in the image pickup device 2, but is located outside of the image pickup device 2, is incorporated in the present invention.

In addition, the respective units of FIG. 1 and FIG. 2 may be composed of a hardware circuit, or at least a part thereof may be composed of software (computer program). Choice of the hardware and the software is arbitrary. The computer program may be stored and provided in a non-transitory storage medium. The computer may have not only a configuration using the CPU, but also a configuration using a graphic processing unit (GPU).

What is claimed is:

1. An imaging device for imaging an object, the imaging device comprising:
an image pickup device configured to output an image signal, the image signal comprising a plurality of frames;
a video signal processor configured to perform processing for generating a video signal based on the image signal;
an image recognition unit, implemented by a hardware circuit, configured to perform a plurality of pieces of recognition processing on the image signal; and
a luminance image creation unit, implemented by a hardware circuit, configured to extract a luminance image from the image signal output from the image pickup device,
wherein the processing of the video signal processor and the processing of the image recognition unit are executed in parallel to each other, and
wherein a number of bits of a digital signal corresponding to the image signal is reduced when the image recognition unit detects a preset state.

2. The imaging device according to claim 1, wherein the image recognition unit performs the plurality of pieces of recognition processing using RAW data output from the image pickup device.

3. The imaging device according to claim 1, wherein the image recognition unit comprises a plurality of filters for extracting different types of features from the luminance image, and the plurality of filters comprise filters based on learning by using a neural network.

4. The imaging device according to claim 3, wherein processing by the plurality of filters comprises convolution processing.

5. The imaging device according to claim 1, wherein the image recognition unit performs the plurality of pieces of recognition processing using color information included in the video signal generated by the video signal processor.

6. The imaging device according to claim 1, wherein the image recognition unit comprises a plurality of filters for extracting different types of features from the luminance image, and the plurality of filters comprise filters provided for a static filter and filters provided for a dynamic filter, the static filter configured to extract features from a luminance image of one frame without motion, the dynamic filter configured to extract features related to motions by comparing information between frames of the image signal.

7. The imaging device according to claim 6, wherein the image recognition unit summarizes the features extracted by the filters for the static filter and the filters for the dynamic filter, and recognizes a content of the luminance image based on a result of summarization.

8. The imaging device according to claim 7, whether the image recognition unit recognizes the content of the luminance image by determining an object corresponding to the features extracted by the filters for the static filter and determining that a motion mode of the object coincides with a motion mode corresponding to the features extracted by the filters for the dynamic filter.

9. The imaging device according to claim 1, wherein the preset state includes a state in which a new object, which has not been present in a previous frame, appears and occupies a certain portion or greater of an image.

10. An imaging device for imaging an object, the imaging device comprising:
an image pickup device configured to output an image signal, the image signal comprising a plurality of frames;
a video signal processor configured to perform processing for generating a video signal based on the image signal; and
an image recognition unit, implemented by hardware circuit, configured to perform a plurality of pieces of recognition processing on the image signal,
wherein the processing of the video signal processor and the processing of the image recognition unit are executed in parallel to each other, and
wherein a frame rate of the image pickup device is increased when the image recognition unit detects a preset state.

11. An imaging device for imaging an object, the imaging device comprising:
an image pickup device configured to output an image signal, the image signal comprising a plurality of frames;

a video signal processor configured to perform processing for generating a video signal based on the image signal; and an image recognition unit, implemented by hardware circuit, configured to perform a plurality of pieces of recognition processing on the image signal, wherein the processing of the video signal processor and the processing of the image recognition unit are executed in parallel to each other, and wherein, when the image recognition unit detects a preset state, the image pickup device thins pixels and outputs only signals of specific pixels.

* * * * *